(12) United States Patent
Black

(10) Patent No.: US 6,819,314 B2
(45) Date of Patent: Nov. 16, 2004

(54) INTENSITY FLATTENER FOR OPTICAL MOUSE SENSORS

(75) Inventor: Robert Arthur Black, Milpitas, CA (US)

(73) Assignee: Agilent Technologies, Inc., Palo Alto, CA (US)

(*) Notice: Subject to any disclaimer, the term of this patent is extended or adjusted under 35 U.S.C. 154(b) by 228 days.

(21) Appl. No.: 10/291,000

(22) Filed: Nov. 8, 2002

(65) Prior Publication Data

US 2004/0090420 A1 May 13, 2004

(51) Int. Cl.$^7$ .................................................. G09G 5/08
(52) U.S. Cl. ........................................ 345/166; 345/163
(58) Field of Search ................................ 345/166, 163; 382/313; 356/330, 126, 239.2; 348/223.1, 224.1, 234, 236, 238, 335, 337, 340, 342, 251; 358/473, 461, 475

(56) References Cited

U.S. PATENT DOCUMENTS 6,570,103 B1 * 5/2003 Saka et al. ............... 178/18.01
6,642,496 B1 * 11/2003 Gulbransen ............... 250/208.1
6,646,571 B1 * 11/2003 Soar et al. .................... 341/13

* cited by examiner

Primary Examiner—Richard Hjerpe
Assistant Examiner—Faranak Fouladi
(74) Attorney, Agent, or Firm—Judy Liao Shie

(57) ABSTRACT

A method and apparatus for flattening the illumination intensity over an optical sensor is disclosed. The intensity of light off the axis from a lens is less than the light on axis by a factor of $\cos^4\theta$, where $\theta$ is the angle from the lens exit pupil to the off-axis point. Light from the lens incident upon the optical sensor therefore will not be uniform in intensity. Light-blocking patches are placed over the areas of the optical sensor where light intensity needs to be reduced to achieve uniform illumination intensity across the entire optical sensor. Areas of the optical sensor that fall closest to the axis of the lens receive the greatest intensity of light due to the rule of $\cos^4\theta$, and therefore will require more light-blocking patches than areas of the optical sensor further away from the lens axis.

13 Claims, 2 Drawing Sheets

INTENSITY FLATTENER FOR OPTICAL MOUSE SENSORS

FIELD OF THE INVENTION

The invention is directed towards the field of optical sensors and, more specifically, towards flattening the illumination intensity across an optical sensor.

BACKGROUND OF THE INVENTION

The optical mouse is a commonly used input device in computer systems. The optical mouse has an optical sensor, a light source for illuminating a surface, and a lens for focusing light reflected from the surface onto the optical sensor. As the optical mouse is moved relative to the surface, it acquires a series of images of the surface. The optical mouse determines its own position relative to the surface by comparing the differences between consecutive images. Ideally, the illumination intensity of the light focused by the lens onto the optical sensor should be uniform, so that the acquired image accurately represents the surface.

However, it is well known in the art that the intensity of light off the axis from a lens is less than the light on axis by a factor of $\cos^4\theta$, where $\theta$ is the angle from the lens exit pupil to the off-axis point. (See chapter 6.7, FIG. 6.10 of *Modern Optical Engineering, Third Edition* by Warren J. Smith, McGraw-Hill, Inc. 2000 for more details). FIG. 1 illustrates the prior art rule of $\cos^4\theta$ with a lens 101, the lens axis 103, an optical sensor 105, exit pupil 107 and the angle $\theta$. The light transmitted to the optical sensor 105 at point B is less than the light transmitted to point A by a factor of $\cos^4\theta$.

The rule of $\cos^4\theta$ means that the light intensity across the optical sensor 105 will not be uniformly flat. Instead, areas of the optical sensor 105 that are closer to the lens axis 103 will experience greater light intensity than areas of the optical sensor 105 that are further from the lens axis 103. This variation in the light intensity across the optical sensor 105 may cause an optical mouse to misread the images it acquires of a surface.

An intensity flattener, such as a gradient neutral density filter, may be used to flatten the illumination intensity across the optical sensor. A gradient neutral density filter is simply a piece of glass with chromium or other light-blocking material sputtered onto it. The more chromium used, the more light that is blocked. The filter is placed either in front of or behind the lens 101 to flatten the illumination intensity. However, these filters are expensive, large, and difficult to position accurately, given the small size of the current optical sensors.

Therefore, there remains a need for a smaller and less expensive solution to flatten the intensity of light across the optical sensor.

SUMMARY OF THE INVENTION

In accordance with an illustrated preferred embodiment of the present invention, a method and apparatus for flattening the illumination intensity over an optical sensor is disclosed. Light-blocking patches are placed over the areas of the optical sensor where light intensity needs to be reduced. The goal is to achieve uniform intensity of illumination across the entire optical sensor. Areas of the optical sensor that fall closest to the axis of the lens receive the greatest intensity of light due to the rule of $\cos^4\theta$, and therefore will require more light-blocking patches than areas of the optical sensor further away from the lens axis.

Although the light-blocking patches may block all wavelengths of light, it is not essential that they do so. Only the wavelength(s) of light used by the optical mouse need to be blocked. The light-blocking patches are added during the process of fabricating the optical sensor. An additional mask will be needed to deposit the light-blocking patches in the proper pattern.

Further features and advantages of the present invention, as well as the structure and operation of preferred embodiments of the present invention, are described in detail below with reference to the accompanying exemplary drawings. In the drawings, like reference numbers indicate identical or functionally similar elements.

DETAILED DESCRIPTION

A typical optical sensor is made of an array of pixels. The array can be of any shape. Pixels located closer to the axis of the lens experience greater light intensity than pixels further from the axis of the lens, due to the rule of $\cos^4\theta$. Therefore, pixels that are closer to the lens axis should be shielded more from the light source, to flatten the illumination intensity across the optical sensor. The closer the pixel is to the lens axis, the more shielding it will need. The shielding can be implemented by simply covering the pixel with some light-blocking patches to reduce the amount of light transmitted to the pixel.

Figure 1:
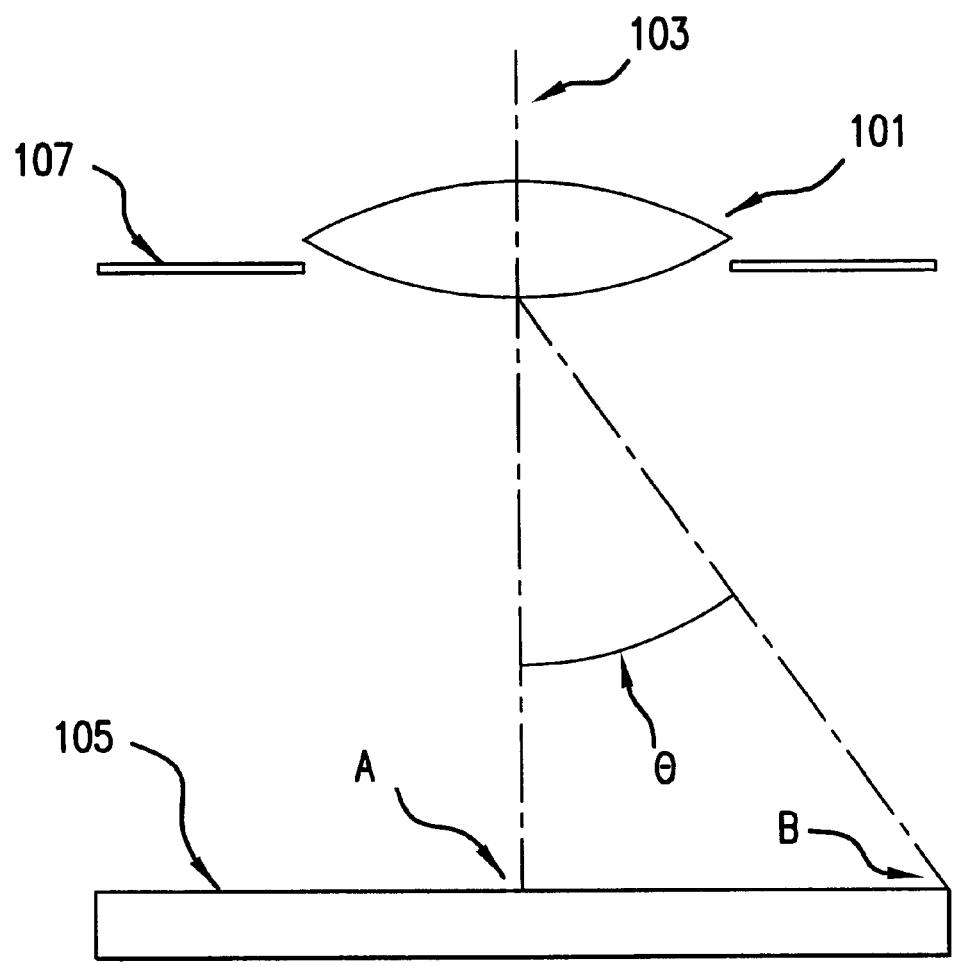
FIG. 1 illustrates the prior art rule of $\cos^4\theta$ for an optical lens.
Figure 2:
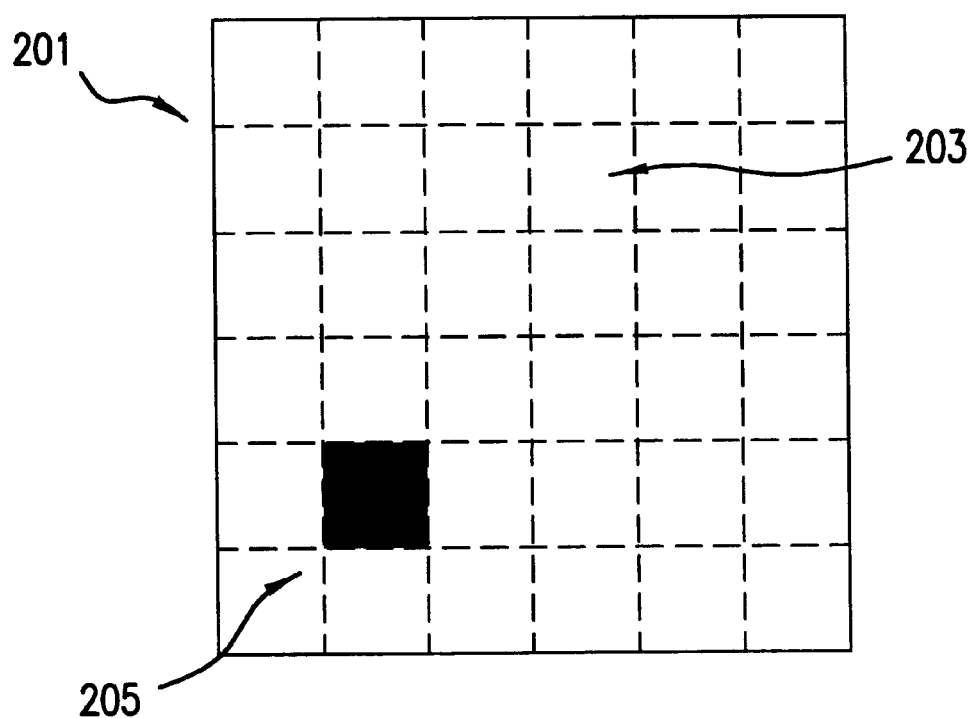
FIG. 2 shows a single pixel of an optical sensor, in a preferred embodiment made in accordance with the teachings of the present invention.

FIG. 2 shows a single pixel 201 of an optical sensor, in a preferred embodiment made in accordance with the teachings of the present invention. In this particular illustration, the pixel has been sectioned into 36 equal square-shaped sites, such as site 203. The number, size, and shape of the sites can be varied. Each site can be shielded from light by covering it with a light-blocking patch, such as light-blocking patch 205. Since there are 36 different sites on this pixel, 36 different levels of light transmission can be achieved. For example, since pixel 201 has a single site covered with a light-blocking patch 205, the light intensity transmitted to pixel 201 has been reduced by $\frac{1}{36}$. If pixel 201 had two sites covered by light-blocking patches, then the light intensity would be reduced by $\frac{2}{36}$.

The size of the pixel area that should be covered up is proportional to the intensity of the light that it receives, and inversely proportional to the distance of the pixel from the lens axis. The light-blocking patches should be distributed fairly evenly over the pixel to obtain the best results. For example, if 18 of the 36 sites on the pixel are to be covered, it is preferable that the 18 sites be evenly scattered throughout the pixel rather than clumped together on the same side of the pixel.

The light-blocking patch can be a filter, metal, or any other material capable of blocking light. If a filter is used as a light-blocking patch, the filter need only block the wavelength of light that is used by the light source. For example, if red light is used as a light source, then the light-blocking patch can be a blue filter material. If another color of light is used as a light source, then the filter should be of a complementary color. Or, a neutral density gray filter material can be used. The filter materials are generally made of acrylic, photoresist, or polyimide. The light-blocking patches can also be made of metal, but the metal must be properly grounded to avoid unwanted capacitive coupling.

The light-blocking patches are deposited using an additional masking step during the process of manufacturing the optical sensor. The size of the light-blocking patches is limited only by the capabilities of the semiconductor process used to create the optical sensor. For example, if the processing technique can manufacture shapes with dimensions as small as one micron, then the light-blocking patches can also have dimensions as small as one micron. As the semiconductor processing techniques improve and process dimensions decrease, the size of the light-blocking patches can decrease correspondingly.

The distribution of the light-blocking patches on the optical sensor depends on many factors, including the back focal length of the lens, the angle of the lens to the optical sensor, and the intensity of the light source. The most important factor, however, is the alignment of the lens in relationship to the optical sensor. Pixels of the optical sensor that fall closest to the lens axis receive the greatest intensity of light, and therefore will require more light-blocking patches than pixels of the optical sensor further away from the lens axis. Since the light-blocking patches are deposited onto the optical sensor prior to final assembly, the mechanical tolerance of the lens with respect to the optical sensor should be tight, so as to ensure proper alignment with the pre-determined pattern of light-blocking patches during final assembly.

If the lens resolves image features smaller than a pixel, the image features may change intensity within the pixel, since portions of the pixel may be covered by light-blocking patches. Therefore, the lens should be designed so that it does not resolve features smaller than a pixel.

Although the present invention has been described in detail with reference to particular preferred embodiments, persons possessing ordinary skill in the art to which this invention pertains will appreciate that various modifications and enhancements may be made without departing from the spirit and scope of the claims that follow.

I claim:

1. An optical mouse sensor, for use with a light source, comprising:
   an array of pixels;
   a lens for focusing light from the light source onto the array; and
   at least one light-blocking patch over a portion of one pixel in the array, wherein the light-blocking patch is used to even out the illumination intensity of light across the array.

2. The optical mouse sensor as in claim 1, wherein the light-blocking patch is a filter.

3. The optical mouse sensor as in claim 2, wherein the light source is red and the filter is blue.

4. The optical mouse sensor as in claim 2, wherein the filter color is complementary to the light source color.

5. The optical mouse sensor as in claim 1, wherein the light-blocking patch includes metal.

6. The optical mouse sensor as in claim 1, wherein the light-blocking patch includes polyimide.

7. The optical mouse sensor as in claim 1, wherein the light-blocking patch includes acrylic.

8. The optical mouse sensor as in claim 1, wherein the light-blocking patch includes photoresist.

9. The optical mouse sensor as in claim 1, wherein multiple light-blocking patches are arranged over the array in a pattern that flattens the illumination intensity of light from the lens onto the array.

10. The optical mouse sensor as in claim 9, wherein the pattern of multiple light-blocking patches is created with a single semiconductor mask.

11. An optical mouse sensor, for use with a light source, comprising:
    an array of pixels; and
    at least one light-blocking patch over at least one portion of one pixel in the array, wherein the light-blocking patch is used to even out the illumination intensity of light across the array.

12. A method for flattening the illumination intensity from a light source onto an image sensor pixel array, comprising:
    determining an area of greater illumination intensity on the pixel array; and
    covering up at least a portion of the pixels in that area with light-blocking patches to flatten the illumination intensity across the pixel array.

13. The method as in claim 12, wherein covering up includes:
    sectioning each pixel into smaller sized sites; and
    depositing light-blocking patches onto at least one site, using a semiconductor manufacturing process.

* * * * *